United States Patent Office 3,673,037
Patented June 27, 1972

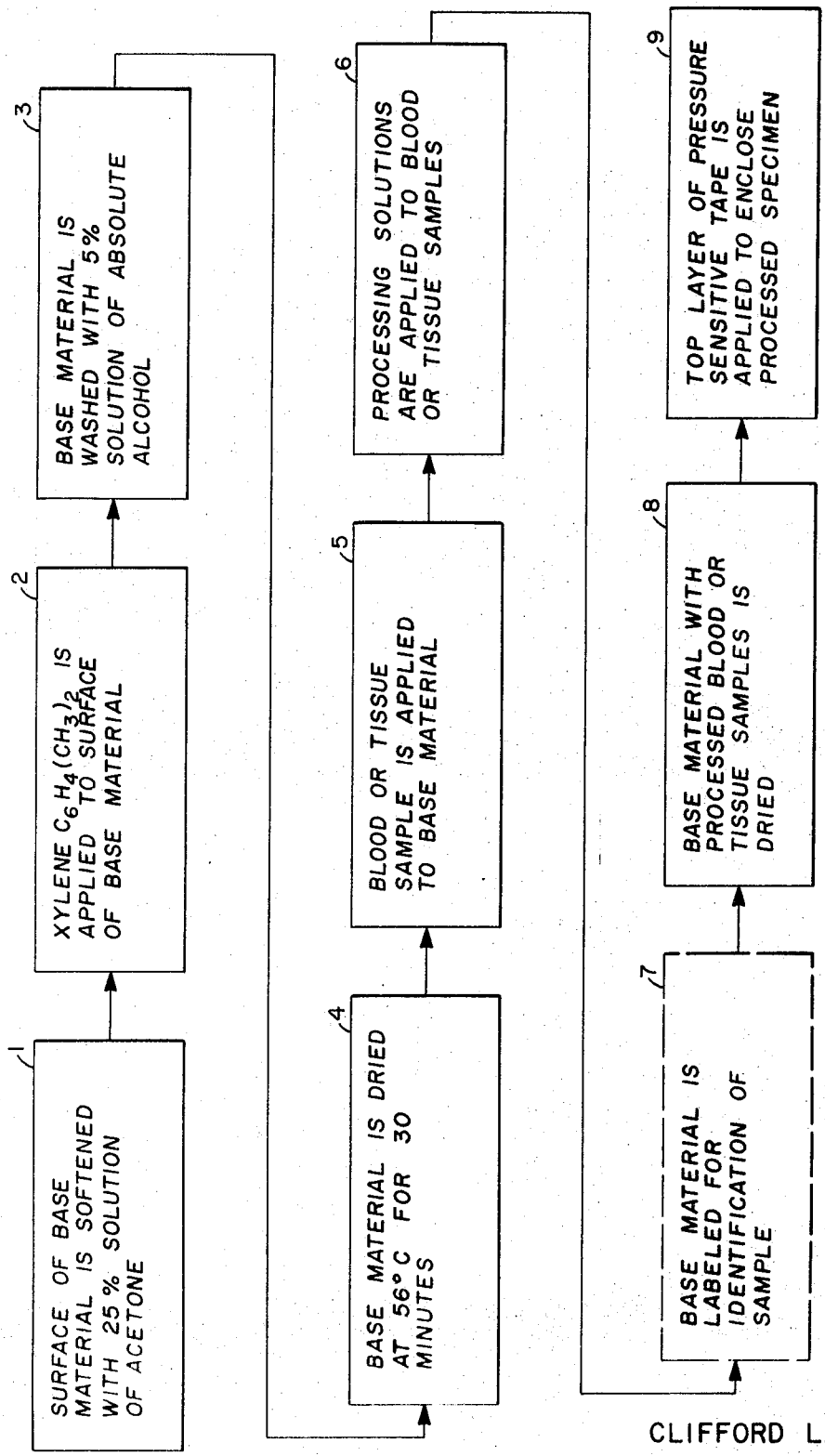

3,673,037
METHOD OF MAKING A LAMINATED ARTICLE COMPRISING BLOOD OR SKIN TISSUE SAMPLES
Clifford L. Reavis, Jr., Garland, Tex., assignor to Intelectron Corporation, New York, N.Y.
Filed Mar. 26, 1969, Ser. No. 810,593
Int. Cl. B32b 31/00
U.S. Cl. 156—280
8 Claims

ABSTRACT OF THE DISCLOSURE

A process for the preparation of a plastic base material such as a film tape to gain the desired surface tension and adherence qualities necessary for the direct application and processing of blood and tissue samples in such a manner that the optical properties of the plastic base material are retained and the processed blood and tissue samples can be viewed both under a microscope and utilizing conventional projection techniques for cellular morphology and population identification.

---

This invention relates to a process for the preparation of a plastic base material such as a film strip or tape to gain the desired surface tension and adherence qualities necessary for the direct application and processing of blood and tissue samples while retaining the optical properties of the plastic base material so that the processed blood and tissue samples can be viewed through a microscope or by means of conventional photographic film projection devices for cellular morphology and population identification.

Heretofore blood and tissue samples have been applied to glass slides and then have been processed. The slides which are quite fragile and easily broken have been stored in special boxes and cabinets which necessitate availability of substantial storage space and intricate filing systems.

Utilizing the conventional glass slides difficulties have also arisen from time to time concerning the labeling of the slides to insure the correct matching of the slides with the patients. The tape system eliminates manual cover slipping and staining of specimens on the glass slides by technicians saving clinical laboratories many man hours. As is obvious, the incorrect matching of the slides with the patients may lead to diagnoses of nonexistent conditions and non-diagnoses of existent conditions with very serious concomitant results.

Utilizing the process of this invention, the blood or tissue sample may be applied directly to a roll of film or a sheet of film such as a microfiche slide. Labeling of the film may be done concurrently with the application of the blood or tissue sample to avoid mix-ups and general confusion.

If the blood and tissue sample is applied directly to a roll of film, a very large number of blood and tissue samples may be applied to one roll of film. The roll of film is not breakable like the glass slides, and many rolls of film each containing many blood and tissue samples can be stored in a very small area.

The film is very quickly scanable leading to quick retrieval of a particular blood or tissue sample which it is desired to view.

Accordingly, it is an object of the subject invention to provide a process for the preparation of a plastic base material such as a film to gain desired surface tension and adherence qualities necessary for the direct application and processing of blood and tissue samples while retaining the optical qualities of the plastic base material so that the processed blood or tissue samples may be viewed under a microscope or by means of conventional photographic projection equipment.

Another object of the subject invention is to provide means for applying blood or tissue samples to a film.

Still another object of the subject invention is to provide an improved method of mounting and storing blood and tissue samples.

Yet another object of the subject invention is to provide a relatively nonbreakable means for mounting and storing blood and tissue samples.

Still another object of the subject invention is to provide improved means for mounting and storing blood and tissue samples enabling quick retrieval of stored information.

A still further object of the subject invention is to provide a process for the preparation of a plastic base material for the direct application and processing of blood and tissue samples which enables a large number of samples to be stored in a small package.

Yet another object of the subject invention is to provide a process for the preparation of a plastic base material for the direct application and processing of blood and tissue samples while retaining the optical properties of the plastic base material wherein the mounting of the sample is relatively permanent and stable.

With the foregoing and other objects in view, the invention resides in a novel process, steps and utilization of ingredients, hereinafter described and claimed, it being understood that changes in the precise embodiment of the invention herein disclosed may be made within the scope of what is claimed without departing from the spirit of the invention.

The invention will appear more clearly from the following detailed description when taken in connection with the accompanying flow diagram showing, by way of example, a preferred embodiment of the inventive idea.

The figure is a flow diagram showing the process of the invention. In carrying out the process, myloid, acetate tape or other plastic base material or film, advantageously "Mylar" (polyethylene terephthalate), a synthetic plastic material available from E. I. du Pont de Nemours & Company, is used as the base. In the first step, as indicated in block 1, the surface of the base material is softened with a 25% solution of acetone. In the second step, as indicated in block 2, xylene $C_6H_4(CH_3)_2$ is applied directly to the surface of the tape material. The xylene may be of grade purity less than 0.025 with a boiling range of 137° to 140° centigrade. The time of application of the xylene to the surface of the base material should be approximately one minute and should not exceed one minute since longer exposure of the base material to the xylene will etch the base material too deeply. In the third step as indicated in block 3, the base material is washed with a 5% solution of absolute alcohol. In the fourth step, as indicated in block 4, the base material is dried at 56° centigrade for thirty minutes. In the fifth step, as indicated in block 5, the blood or tissue sample is applied directly to the base material. In the sixth step, as indicated in block 6, the dyes or stains or other chemicals required for proper processing of the blood or tissue sample are applied directly to the blood or tissue sample. In the seventh step, as indicated in block 7, the base material is labeled to identify the particular blood or tissue sample. Any material capable of marking the plastic base material may be used for the identification marking. This seventh step may be eliminated or performed at a different stage of the process. In step number eight, as indicated in block 8, the base material is allowed to dry. Drying may be done atmospherically or by use of a blower. In step number nine a top layer of pressure sensitive plastic tape or heat laminated tape is applied to enclose the specimen and protect it from deterioration and damage such as abrasion. After step eight or step nine the base material, if a roll of film, is rolled up and if a flat film, such as a microfiche card, it is appropriately filed in the microfiche card holder or other storage receptacle.

Although the present invention has been described in conjunction with a preferred embodiment, it is to be understood that modifications and variations may be resorted to without departing from the spirit and scope of the invention as those skilled in the art will readily understand. Such modifications and variations are considered to be within the purview and the scope of the invention and the appended claims.

What I claim as my invention and desire to secure by Letters Patent of the United States is:

1. In a process for preparing a plastic base film material having optical properties necessary for the observation of blood and tissue samples thereon to gain the desired surface tension and adherence characteristics necessary for the subsequent direct application and processing of such blood and tissue samples of desired sizes, in the absence of deterioration of said optical properties and having said plastic base film material with such optical properties, the steps which comprise preselecting a plurality of surface areas on said film material of a size large enough to accommodate the number and size of the particular samples to be applied thereon subsequently, softening said surface areas determined from said preselecting step with the application of acetone, thereafter applying to said softened areas xylene, thereafter washing said areas with absolute alcohol, drying said washed areas, adhering samples on said plurality of treated areas, treating said samples as required with a member selected from the group consisting of dyes, stains and other chemicals for the subsequent observation thereof on said base film material, and drying said treated samples in a second drying step.

2. A method as recited in claim 1, in which the duration of said applying step does not exceed one minute.

3. A method as recited in claim 1, in which said drying step is carried out at a temperature of 56° C. for a period of thirty minutes.

4. A method as recited in claim 1, in which said softening step is carried out with a 25% solution of acetone, and said washing step is carried out with a 5% solution of absolute alcohol.

5. A method as recited in claim 1 which includes the additional step of marking said plastic base film material adjacent said areas for identification of the sample in those areas.

6. A process as described in claim 5, which includes the additional step of covering said samples on said plurality of areas with a top layer of protective material.

7. A process as described in claim 6, in which said covering step is carried out by application of pressure sensitive plastic tape.

8. A process as described in claim 6, in which said covering step is carried out by heat laminating a top layer of tape to base material film and over the said sample carrying treated areas.

References Cited
UNITED STATES PATENTS

| | | | |
|---|---|---|---|
| 2,566,533 | 9/1951 | Poux | 156—146 |
| 2,962,843 | 12/1960 | Hoelzer et al. | 156—145 |
| 3,470,049 | 9/1969 | Reusch | 156—145 |

CARL D. QUARFORTH, Primary Examiner

S. J. LECHERT, JR., Assistant Examiner

U.S. Cl. X.R.

156—3, 62, 277, 278, 280, 299, 300, 306, 314